3,249,578
COATING COMPOSITIONS OF A DIBASIC POLY-
CARBOXYLIC ACID/TRIS (2-HYDROXYETHYL)
ISOCYANURATE POLYESTER AND A PHENOL-
FORMALDEHYDE RESIN
John F. Meyer, Schenectady, and Edmund J. Zalewski, Rotterdam, N.Y., assignors to Schenectady Chemicals, Inc., Schenectady, N.Y., a corporation of New York
No Drawing. Filed Feb. 10, 1965, Ser. No. 431,732
19 Claims. (Cl. 260—33.4)

This application is a continuation-in-part of application Serial No. 117,499 filed June 16, 1961.

This invention relates to esters of tris (2-hydroxyethyl) isocyanurate and electrical conductors coated therewith.

It is a primary object of the present invention to provide improved polyester coatings for electrical conductors.

Another object is to prepare tris (2-hydroxyethyl) isocyanurate polyester containing wire enamels which have improved flexibility, heat aging and better mandrel after snap properties.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will beome apparent to those skilled in the art from this detailed description.

To improve the abrasion resistance of wire enamels from tris (2-hydroxyethyl) isocyanurate polyesters of terephthalic acid it has been proposed to add a melamine-formaldehyde resin. However, such melamine-formaldehyde containing wire enamels do not have as good flexible heat aging and mandrel after snap properties as is desired for certain uses.

It has now been found that by using a phenol-formaldehyde resin in the wire enamel that not only does the coated wire have good abrasion resistance but there is markedly improved flexible heat aging and mandrel after snap properties as compared with the melamine-formaldehyde containing wire enamels.

The polyester is made by reacting tris (2-hydroxyethyl) isocyanurate with terephthalic acid or isophthalic acid or an ester forming derivative of such acids.

The tris (2-hydroxyethyl) isocyanurate can be employed as the sole polyhydric alcohol or it can be replaced in part by one or more other polyhydric alcohols. While as little as 10% of the total polyhydric alcohol can be the tris (2-hydroxyethyl) isocyanurate, preferably at least 50% of the total polyhydric alcohol is the isocyanurate on a weight basis.

On an equivalent percent basis preferably at least 25% of the total polyhydric alcohol is the tris (2-hydroxyethyl) isocyanurate.

In making the polyester usually 15 to 46 equivalent percent is the carboxylic acid reactant and the balance is the polyhydric alcohol, i.e., there should be an excess of alcoholic groups over acid groups.

All of the polycarboxylic acid constituent can be the terephthalic acid or isophthalic acid or a portion up to 80 equivalent percent of the acid constituent can be a different acid. Preferably at least 50 equivalent percent of the acid component is terephthalic acid. The term equivalent percent is conventionally employed in the art since the alcohol and acid components react on an equivalent rather than a molar basis. The term equivalent percent is defined for example in Sheffer Patent No. 2,889,304 and Precopio Patent No. 2,936,296.

When a modifying polyhydric alcohol is employed, it can be ethylene glycol; glycerine; pentaerythritol; 1,1,1-trimethylolethan; 1,1,1-trimethylolpropane; sorbital; mannitol; dipentaerythritol; aliphatic hydrocarbon diols, e.g., butanediol 1,4; pentandiol 1,5; butene 2-diol 1,4; butanediol 1,3; butyne-2-diol 1,4; butanediol 1,2; hexanediol 1,3; hexanediol 1,2; and cyclic glycols, e.g., 2,2,4,4-tetramethyl-1,3-cyclobutanediol, hydroquinone di beta hydroxyethyl ether and 1,4-cyclohexanedimethanol.

As the acid reactant there is employed terephthalic acid or isophthalic acid or acyl halides thereof, e.g., terephthaloyl dichloride or a lower dialkyl ester thereof, e.g., methyl, ethyl, propyl, butyl, amyl, hexyl and octyl terephthalates and the corresponding isophthalates as well as the half esters, e.g., monomethyl terephthalate as well as mixtures of such esters and acids or acid halides. Preferably dimethyl terephthalate is employed.

When a modifying polycarboxylic acid is employed it can be either aliphatic or aromatic. Typical examples are adipic acid, ortho phthalic anhydride, hemimellitic acid, trimesic acid, trimellitic acid, succinic acid, tetrachloro phthalic anhydride, hexachloroendomethylene tetrahydrophthalic acid, maleic acid, sebacic acid, etc.

To improve abrasion properties of the wire enamel small amounts of metal driers are employed.

The total number of hydroxyl groups on the alcohols normally is 1 to 1.6 times the total number of carboxyl groups on the acids.

The properties of the polyester can be improved by the addition of a polyisocyanate in an amount of 0.1%, 10% or even 40% by weight of the total of polyisocyanate and polyester. Preferably the polyisocyanate is 0.1–15% by weight of the total solids in the wire enamel.

Preferably, the polyisocyanate has at least three available isocyanate groups.

Among the polyisocyanates which can be employed there may be mentioned diisocyanates such as 2,4-tolylene diisocyanate,
2,6-tolylene diisocyanates,
cyclopentylene diisocyanate,
m-Phenylene diisocyanate,
p-Phenylene diisocyanate,
Ethylene diisocyanate,
Butylidene diisocyanate,
1,5-naphthalene diisocyanate,
1,6-hexamethylene diisocyanate,
Dianisidine diisocyanate,
4,4'-diphenyl ether diisocyanate,
4,4'4''-triphenyl methane triisocyanate (Desmodur R), the cyclic trimer of 2,4-tolylene diisocyanate, the cyclic trimer of 2,6-tolylene diisocyanate, mixtures of the cyclic trimers of 2,4-tolylene diisocyanate and 2,6-tolylene diisocyanate, the trimer of 4,4'-diphenyl methane diisocyanate, trifunctional isocyanate trimers having the formula:

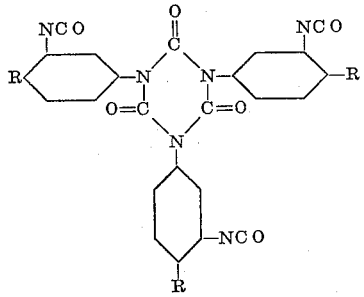

where R is a lower alkyl radical, e.g., n-butyl,
tertiary butyl,
secondary butyl,
isopropyl,
methyl,
ethyl, etc.,
1,3,5-triisocyanate benzene,
2,4,6-triisocyanate toluene,
4,4'-dimethyl-diphenylmethane,
2,2',5,5'-tetraisocyanate,
2,4,4'-triisocyanate diphenylmethane,
2,4,6-triisocyanato diphenyl ether,
2,2',4-triisocyanate diphenyl ether,
2,2',4-triisocyanate diphenyl sulfide,
2,4,4'-triisocyanato diphenyl sulfide,
2,3',4-triisocyanato-4'-methyl diphenyl ether,
2,3',4-triisocyanato-4'-methoxydiphenyl ether,
2,4,4'-triisocyanato-3'-chlorodiphenyl ether,
4,4',6-diphenyl triisocyanate,
1,2,4-butanetriol triisocyanate,
1,3,3-pentane triisocyanate,
1,2,2-butane triisocyanate,
phloroglucinol triisocyanate, the reaction product of 3 mols of 2,4-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol propane, the reaction product of 3 mols of 2,4-tolylene diisocyanate with 1 mol of trimethylol ethane and, in general, the reaction product of a diisocyanate with sufficient polyhydric alcohol to react with half the isocyanate groups.

While the polyisocyanates can be used as such, particularly where pot life is not important, it is preferred to block the isocyanate groupings with a group that will split off at the reaction temperature employed with the polymeric terephthalic or isophthalic ester. Typical compounds which can be used to block the isocyanate groupings, e.g., by forming carbamates therewith, are monohydric phenols, such as phenol, meta-cresol, paracresol, orthocresol and mixtures thereof, the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitro phenol, 4-nitro phenol, 3-nitro phenol, monohydric alcohols such as methyl alcohol, ethyl alcohol, n-propyl alcohol, isopropyl alcohol, tertiary butyl alcohol, tertiary amyl alcohol, octyl alcohol, stearyl alcohol, acetoacetic ester, hydroxyalkylcarbamic acid aryl esters, e.g., hydroxyethylcarbamic acid phenyl ester, hydroxyethylcarbamic acid cresyl ester, diethyl malonate, mercaptans, e.g., 2-mercaptobenzothiazole,
2-mercaptothiazoline,
dodecyl mercaptan,
ethyl 2-mercaptothiazole,
p-naphthyl mercaptan,
α-naphthyl mercaptan,
methyl mercaptan,
butyl mercaptan,
lactams, e.g., ε-caprolactam, Δ-valerolactam, γ-butyrolactam, β-propiolactam, imides, e.g., succinimide, phthalimide, naphthalimide, glutarimide, dimethylphenyl carbinol, secondary amines, e.g., o-ditolyamine, m-ditolyamine, p-ditolyamine, N-phenyl toluidine, phenyl-α-naphthylamine, carbazole, diphenylamine, etc., mono-α-phenylethyl, di-α-phenylethyl phenol, tri-α-phenylethyl phenol, carvacrol, thymol, methyl diphenyl carbinol, triphenyl carbinol, 1-nitro tertiary butyl carbinol, 1-chloro-tertiary butyl carbinol, triphenyl silanol, 2,2'-dinitrodiphenylamine, 2,2'-dichloro diphenylamine, ethyl n-butyl malonate, ethyl benzyl malonate, acetyl acetone, acetonyl acetone, benzimidazole, 1-phenyl-3-methyl-5-pyrazolone.

As specific examples of such blocked polyisocynates, there may be mentioned Mondur S, wherein the isocyanate groups of the reaction product of 3 moles of mixed 2,4, and 2,6-tolylene diisocyanate with trimethylpropane are blocked by esterification with phenol and Mondur SH, wherein the mixed cyclic trimers of 2,4 and 2,6-tolylene diisocyanates have the three free isocyanate groups blocked by esterification with m-cresol. At present Mondur SH is the preferred polyisocyanate.

Other blocked polyisocyantes include the cyclic trimer of 2,4-tolylene didisocyanate having the isocyanate groups blocked with tertiary butyl alcohol or tertiary amyl alcohol or dimethyl ethinyl carbinol or aceto-acetic acid ester or phenol or cresylic acid or ε-caprolactum or 2-mercaptobenzothiazole or succinimide or phthalimide or diphenyl amine or phenyl-β-naphthyl amine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester either dry or dissolved in a solvent prior to mixing. The reaction between the polyester and the polyisocyanate is hastened by using elevated temperatures and in preparing wire enamels they are usually reacted at a temperature of about 650 to 800° F.

The metal drier is preferably used in an amount of 0.2 to 1.0% metal based on the total solids in the enamel. Typical metal driers include the zinc, lead, calcium or cadmium linoleates, octoates, and resinates of each of these metals, e.g., zinc resinate, cadmium resinate, lead linoleate, calcium linoleate, zinc naphthenate, lead naphthenate, calcium naphthenate, cadmium naphthenate, zinc octoate, and cadmium octoate. Other suitable metal driers, specifically polyvalent metal driers such as manganese naphthenate and cobalt naphthenate can be employed.

It has further been found that the properties of the polyester wire enamel can be improved by incorporating a tetrahydrocarbon titanate. Typical titanates include tetraalkyl titanates such as tetraisopropyl titanate, tetropropyl titanate, tetrabutyl titanate, tetraamyl titanate, tetrahexyl titanate, tetraethyl titanate, tetramethyl titanate and diisopropyl dibutyl titanate as well as carbocyclic aryl titanates such as tetraphenyl titanate, tetra cresyl titanate (made from any of the cresol isomers alone or in admixture with each other) and tetraxylenyl titanate.

The titanate is used in small amounts, e.g., .001 to

10%, preferably 1–8% based on the total solids in the wire enamel.

As the phenol-formaldehyde resin there can be used heat reactive condensation proucts of formaldehyde with phenols such as phenol per se, o-cresol, m-cresol, p-cresol, mixed cresols, e.g., cresylic acid and meta para cresol, xylenol, diphenylol propane, p-butylphenol, p-tert. amyl phenol, p-octyl phenol p,p′-dihydroxydiphenyl ether. Obviously mixtures of phenols can be used as indicated above. There can be used 0.5 to 1.5 moles of formaldehyde per mole of phenol. Preferably less than 1 mole of formaldehyde is employed per mole of phenol. Most preferably about 0.8 mole of formaldehyde is used. The preferred phenol is cresol.

The phenol formaldehyde resin is preformed in conventional manner prior to addition to the polyester.

The solvent employed in making the wire enamel is cresylic acid. Cresylic acid has a boiling range of 185 to 230° C. and is a mixture of o-, m- and p-cresols. The individual cresols, e.g., para cresol, meta cresol or ortho cresol can be employed although it is preferred to use the commercial cresylic acid mixture.

It is frequently desirable to dilute the cresylic acid with an aromatic hydrocarbon, e.g., a heavy coal tar or petroleum naphtha or with xylene, etc. The naphtha can be employed in an amount of from 0 to 60%, e.g. 5 to 60%, based on the total weight of the solvents; preferably, the naphtha should be 30–40%. Various conventional aromatic naphthas, especially high boiling naphthas can be employed such as EW naphtha (an enamel wire heavy coal tar naphtha sold by the Barrett Division of Allied Chemical and Dye Corporation) and Solvesso No. 100, an aromatic naphtha derived from petroleum.

Normally the wire enamel is made up as a 25–50% solids concentration although this can be varied as desired. The preferred solvent is a mixture of 65% cresylic acid and 35% of an aromatic naphtha.

The wire enamel is applied to the wire, e.g., copper wire, by either the "free dip" or the die application procedure. In the following specific examples in which wire test results are recorded the die application procedure was employed to obtain a build up of approximately 3 mils on No. 18 A.W.G. copper wire. The enamel was baked on the wire at 750° F.

The preferred range of ingredients on a 100% solids (i.e. excluding solvents) basis is as follows:

| | Percent |
|---|---|
| Terephthalate or isophthalate polyester | 75–95 |
| Polyisocyanate | 0.1–15 |
| Titanate | 1–8 |
| Phenol-formaldehyde resin | 1–10 |

Unless otherwise indicated all parts and percentages are by weight.

Typical examples of polyesters suitable for use in the present invention are given in Examples 1–7.

*Example 1*

| | |
|---|---|
| Ethylene glycol, grams | 147 |
| Glycerine, grams | 97 |
| 1,4-butanediol, grams | 74 |
| Tris (2-hydroxethyl) isocyanurate, grams | 608 |
| Dimethyl terephthalate, grams | 1164 |
| Litharge (catalyst), grams | 0.3 |
| Solvesso 100, ml. | 224 |
| Xylol, ml. | 100 |

The above mixture was reacted at a temperature of 430–435° F., until a hydroxyl value of 154.5 was reached. The product was then reduced to 50.6% solids with cresylic acid to produce product A.

*Example 2*

| | |
|---|---|
| 2,2,4,4-tetramethyl 1,3-cyclobutanediol, grams | 119.6 |
| Tris (2-hydroxyethyl) isocyanurate, grams | 511 |
| Ethylene glycol, grams | 129 |
| Glycerine, grams | 128 |
| Dimethyl terephthalate, grams | 1112.8 |
| Litharge, grams | 0.4 |
| Xylol, ml. | 86 |
| Solvesso 100, ml. | 258 |

This mixture was reacted using an azeotropic distillation at a temperature of 490–500° F. until a hydroxyl value of 136 was reached. The batch was then reduced to 50.9% solids with cresylic acid to produce product B.

*Example 3*

The process of Example 1 was repeated but the heating at 430–435° F. was continued until the hydroxyl value was 124. This product was reduced to 51% solids with cresylic acid and labeled product C.

*Example 4*

| | |
|---|---|
| Tris (2-hydroxyethyl) isocyanurate, grams (4 moles) | 1044 |
| Dimethyl terephthalate, grams (4 moles) | 776 |
| Xylol, ml. | 100 |
| Solvesso 100, ml. | 200 |
| Tetraisopropyl titanate, grams | 3.6 |

The above mixture was charged into a 3 liter reaction kettle equipped with a distillation condenser, stirrer and thermometer. The temperature was raised slowly over the course of 6 hours until 365° F. was reached. At this time the batch was reduced with cresylic acids to a solids content of 73.9%.

*Example 5*

| | |
|---|---|
| Tris (2-hydroxyethyl) isocyanurate, grams | 992 |
| Ethylene glycol, grams | 88 |
| Dimethyl terephthalate, grams | 920 |
| Litharge, grams | 0.3 |
| Xylol, ml. | 100 |
| Solvesso 100, ml. | 200 |

The above mixture was charged into the same reaction vessel as that used in Example 4. The batch was slowly heated during 8 hours until a temperature of 440° F. was attained. Cresylic acid was then added to yield a solids content of 67.2%.

*Example 6*

| | Lbs. |
|---|---|
| Tris (2-hydroxyethyl) isocyanurate | 4400 |
| Ethylene glycol | 481 |
| Dimethyl terephthalate | 5019 |
| Litharge | 4.5 |
| Xylol | 2173 |

The batch was slowly heated as in Example 5. There were added a total of 9775 lbs. of cresylic acid and 5265 lbs. of Solvesso 100 to yield a polyester solution having a solids content of 35%.

*Example 7*

| | |
|---|---|
| Tris (2-hydroxyethyl) isocyanurate, grams | 556 |
| Dimethyl terephthalate, grams | 413 |
| Adipic acid, grams | 31 |
| Litharge, grams | 0.15 |
| Xylol, ml. | 50 |
| Solvesso 100, ml. | 100 |

The above mixture was charged into the reaction vessel. The batch was slowly heated over the course of 8 hours until a temperature of 465° F. was reached. At this time the batch was reduced with cresylic acid until a solids content of 50.5% was obtained.

A typical example of a preferred phenol-formaldehyde resin is given in Example 8.

Example 8

| | Lbs. |
|---|---|
| Meta para cresol | 3440 |
| 37% aqueous formaldehyde | 1962 |
| Triethanolamine (catalyst) | 64 |

This mixture was heated at reflux for 1.5 hours, cooled to 130° F., and 59 lbs. of salicyclic acid added. Vacuum of about 26 inches was then applied and water removed by distillation. The temperature initially dropped to 105° F. and then gradually rose to 176° F. over a period of 2 hours. The vacuum was stopped, the heat shut off and 4,058 lbs. of cresylic acid added to give an m-p-cresol formaldehyde resin solution containing 40% solids.

In Example 9 the indicated solids were diluted to 30% solids concentration in a solvent containing 65% cresylic acid and 35% Solvesso 100 to make the wire enamels which were applied to the wire for testing purposes.

Example 9

| | a | b |
|---|---|---|
| Polyester of Example 6 (at 100% solids) | 81.09% | 86.14%. |
| Mondur SH | 12.97% | 4.74%. |
| Resimene 882 (melamine-formaldehyde) | 3.89% | |
| Tetraisopropyl titanate | 2.05% | 4.54%. |
| m-p-Cresol-formaldehyde resin of Example 8 (at 100% solids). | | 4.58%. |
| Wire appearance | Good | Good. |
| Mandrel passed after snap (flex) | 3× | 2×. |
| Heat shock 1 hr. at 200° C. 10% stretch | 3× | |
| Heat shock 1 hr. at 200° C. 15% stretch | | 2×. |
| Flex heat aging at 175° C | Fail 24 hrs | >168 hrs. |

Examples 9(a) and 9(b) represent commercial materials. The product of Example 9(b) which is within the invention exhibiting superior heat shock and flexible heat aging properties to those of Example 9(a) which is outside the invention.

Example 10

| | Grams |
|---|---|
| Polyester of Example 6 (at 100% solids) | 400 |
| Mondur SH | 44 |
| m-p-Cresol-formaldehyde resin of Example 8 at 39% solids in cresylic acid | 69.2 |
| Cresylic acid (additional) | 684 |
| Solvesso 100 | 368 |
| Tetraisopropyl titanate | 17.76 |

The wire enamel had a smooth appearance on the wire. The heat shock 1 hr. at 200° C. with 15% stretch passed 3× mandrel and the flexible heat aging at 175° C. was >96 hours.

Example 11

| | Grams |
|---|---|
| Polyester of Example 6 (at 100% solids) | 400 |
| Mondur SH | 44 |
| Cresol-formaldehyde resin of Example 8 at 40% solids in cresylic acid | 50.4 |
| Cresylic acid (additional) | 683 |
| Solvesso 100 | 367 |
| Tetraisopropyl titanate | 10 |

The coated wire was smooth. The heat shock after 1 hour at 200° C. with 15% stretch passed 2× mandrel and the flexible heat aging at 175° C. was >144 hours.

Example 12

| | Grams |
|---|---|
| Polyester of Example 6 (at 100% solids) | 400 |
| Mondur SH | 12 |
| Cresol-formaldehyde resin of Example 8 at 40% solids in cresylic acid | 50.4 |
| Cresylic acid (additional) | 635 |
| Solvesso 100 | 341 |
| Isopropyl titanate | 17.75 |

The coated wire was smooth. The heat shock after 1 hour at 200° C. with 15% stretch passed 2× mandrel and the flexible heat aging at 175° C. was >96 hours.

What is claimed is:

1. An electrical conductor provided with a continuous coating comprising 75–95 parts of a polymeric ester of a polycarboxylic acid of the group consisting of terephthalic acid and isophthalic acid and tris (2-hydroxyethyl) isocyanurate together with 1–10 parts of a phenol-formaldehyde resin, said polymeric ester having free hydroxyl groups.

2. An electrical conductor according to claim 1 wherein the polycarboxylic acid is terephthalic acid.

3. An electrical conductor according to claim 2 wherein the phenol-formaldehyde resin is a cresol-formaldehyde resin.

4. An electrical conductor according to claim 3 wherein the coating includes a minor amount of a tetrahydrocarbon titanate.

5. An electrical conductor according to claim 4 wherein the coating includes a minor amount of an organic polyisocyanate.

6. An electrical conductor provided with a continuous coating of a composition comprising 75–95% of a polymeric ester of terephthalic acid and tris (2-hydroxyethyl) isocyanurate, 0.1–15% of an organic polyisocyanate, 1–8% of a tetraalkyl titanate and 1–10% of a phenol-formaldehyde, said polymeric ester having free hydroxyl groups.

7. An electrical conductor according to claim 6 wherein the phenol-formaldehyde resin is a cresol-formaldehyde resin.

8. An electrical conductor according to claim 6 wherein the cresol-formaldehyde resin is made from less than 1 mole of formaldehyde per mole of cresol and a portion of the tris (2-hydroxyethyl) isocyanurate up to 50 equivalent percent of the total polyhydric alcohol is replaced by ethylene glycol.

9. A composition comprising a major amount of a polymeric ester of a polycarboxylic acid of the group consisting of terephthalic acid and isophthalic acid and tris (2-hydroxyethyl) isocyanurate together with a minor amount of a phenol-formaldehyde oesin, said polymenic ester having free hydroxyl groups.

10. A composition according to claim 9 dissolved in an organic solvent comprising a cresol.

11. A wire enamel comprising a major amount of a polymeric ester of terephthalic acid and tris (2-hydroxyethyl) isocyanurate together with a minor amount of a phenol-formaldehyde resin, said polymeric ester having free hydroxyl groups.

12. A wire enamel according to claim 11 wherein the phenol-formaldehyde resin is a cresol-formaldehyde resin.

13. A wire enamel according to claim 11 including a minor amount of an organic polyisocyanate.

14. A wire enamel according to claim 11 including a minor amount of a tetrahydrocarbon titanate.

15. A wire enamel according to claim 11 including a minor amount of an organic polyisocyanate and a minor amount of a tetraalkyl titanate and in which the phenol-formaldehyde resin is a cresol-formaldehyde resin.

16. A wire enamel comprising on a solids basis 75–95% of a polymeric ester of terephthalic acid and tris (2-hydroxyethyl) isocyanurate, 0.1–15% of an organic polyisocyanate, 1–8% of a tetraalkyl titanate and 1–10% of a phenal formaldehyde resin, said polymeric ester having free hydroxyl groups.

17. A wire enamel according to claim 16 wherein the phenol-formaldehyde resin is made from less than 1 mole or formaldehyde per mole phenol.

18. A wire enamel according to claim 17 wherein the phenol of the phenol-formaldehyde resin is cresol.

19. A wire enamel according to claim 18 wherein a portion of the tris (2-hydroxyethyl) isocyanurate up to 50 equivalent percent of the total polyhydric alcohol is replaced by an alkanediol having 2 to 6 carbon atoms.

References Cited by the Examiner

UNITED STATES PATENTS

| | | |
|---|---|---|
| 2,889,304 | 6/1959 | Sheffer et al. 260—75 |
| 2,935,487 | 5/1960 | Fox et al. |
| 2,982,754 | 5/1961 | Sheffer et al. |

FOREIGN PATENTS 836,004  1/1960  Great Britain.

OTHER REFERENCES

Frazer, Journal of Organic Chemistry, vol. 25, pages 1944–46, 1960.

Payne, Organic Coating Technology, vol. II, page 1167, 1961.

MORRIS LIEBMAN, *Primary Examiner.*

L. T. JACOBS, *Assistant Examiner.*